(12) United States Patent
Suzuki et al.

(10) Patent No.: US 7,895,829 B2
(45) Date of Patent: Mar. 1, 2011

(54) EXHAUST PURIFICATION DEVICE OF ENGINE

(75) Inventors: Kazunori Suzuki, Nagoya (JP);
Masatoshi Kuroyanagi, Kariya (JP);
Yoshiaki Nishijima, Toyokawa (JP)

(73) Assignee: Denso Corporation, Kariya (JP)

( * ) Notice: Subject to any disclaimer, the term of this patent is extended or adjusted under 35 U.S.C. 154(b) by 690 days.

(21) Appl. No.: 11/907,450

(22) Filed: Oct. 12, 2007

(65) Prior Publication Data

US 2008/0092531 A1   Apr. 24, 2008

(30) Foreign Application Priority Data

Oct. 19, 2006   (JP) ............... 2006-284628

(51) Int. Cl.
*F01N 3/00* (2006.01)
(52) U.S. Cl. ............... 60/286; 60/295; 60/298; 60/301; 60/303
(58) Field of Classification Search ............ 60/274, 60/286, 295, 297, 298, 301, 303
See application file for complete search history.

(56) References Cited

U.S. PATENT DOCUMENTS

| | | | | |
|---|---|---|---|---|
| 5,522,218 | A * | 6/1996 | Lane et al. ............. | 60/274 |
| 6,279,603 | B1 * | 8/2001 | Czarnik et al. ........... | 137/339 |
| 6,301,879 | B1 * | 10/2001 | Weisweiler et al. ...... | 60/274 |
| 6,513,323 | B1 * | 2/2003 | Weigl et al. ............. | 60/286 |
| 6,539,708 | B1 * | 4/2003 | Hofmann et al. ......... | 60/286 |
| 7,614,213 | B2 * | 11/2009 | Hirata et al. ............ | 60/286 |
| 7,647,767 | B2 * | 1/2010 | Osaku et al. ............ | 60/286 |
| 2007/0079599 | A1 | 4/2007 | Osaku et al. | |
| 2007/0092413 | A1 | 4/2007 | Hirata et al. | |
| 2009/0151335 | A1 | 6/2009 | Hirata et al. | |
| 2009/0293460 | A1 | 12/2009 | Hirata et al. | |

FOREIGN PATENT DOCUMENTS

| | | |
|---|---|---|
| DE | 201 21 115 | 5/2003 |
| EP | 1 669 567 | 6/2006 |
| JP | 2005-90431 | 4/2005 |
| JP | 2005-325691 | 11/2005 |

OTHER PUBLICATIONS

Japanese Office Action dated Aug. 24, 2010, issued in corresponding Japanese Application No. 2006-284628, with English translation.

\* cited by examiner

*Primary Examiner*—Binh Q Tran
(74) *Attorney, Agent, or Firm*—Nixon & Vanderhye PC

(57) ABSTRACT

A DPF and a SCR catalyst are provided in an exhaust pipe, and a urea solution addition valve is provided between the DPF and the SCR catalyst for performing addition supply of urea solution into the exhaust pipe. In a urea solution supply system, the urea solution of prescribed concentration is stored in a urea solution tank, and a urea solution pump is provided in the tank. A urea solution supply pipe is connected to the urea solution pump. A part of the urea solution supply pipe is structured as a compound pipe structure defining two passages. One of the two passages serves as a urea solution passage, and the other one serves as an engine coolant passage.

17 Claims, 4 Drawing Sheets

EXHAUST PURIFICATION DEVICE OF ENGINE

CROSS REFERENCE TO RELATED APPLICATION

This application is based on and incorporates herein by reference Japanese Patent Application No. 2006-284628 filed on Oct. 19, 2006.

BACKGROUND OF THE INVENTION

1. Field of the Invention

The present invention relates to an exhaust purification device of an engine, and more specifically to an exhaust purification device suitably applicable to a urea SCR (Selective Catalytic Reduction) system.

2. Description of Related Art

In recent years, a urea SCR system has been developed and has been partly put into practical use as an exhaust purification device for purifying NOx (nitrogen oxides) in exhaust gas at a high purifying rate in an engine (specifically, diesel engine) applied to a vehicle or the like. A following structure is known as a urea SCR system.

That is, in the urea SCR system, a SCR catalyst is provided in an exhaust pipe connected to an engine main body, and a urea solution addition valve for adding urea solution as a reducing agent into the exhaust pipe is provided upstream of the SCR catalyst. A urea solution tank is connected to the urea solution addition valve through a urea solution supply pipe. For example, if a pump provided in the urea solution tank is driven to discharge the urea solution, the urea solution is supplied to the urea solution addition valve through the urea solution supply pipe from the urea solution tank.

In this system, if the urea solution is added by the urea solution addition valve into the exhaust pipe, the urea solution is supplied to the SCR catalyst with the exhaust gas and the exhaust gas is purified by reduction reaction of the NOx on the SCR catalyst. When the NOx is reduced, the urea solution is hydrolyzed with exhaust heat to generate ammonia ($NH_3$), which is added to the NOx in the exhaust gas selectively adsorbed by the SCR catalyst. The NOx is reduced and purified through the reduction reaction based on the ammonia on the SCR catalyst.

In the urea SCR system, the urea solution used as the reducing agent freezes, for example, at −11° C., and a trouble arises in the use of the urea solution because of the freeze. Therefore, as a countermeasure against the freeze of the urea solution, a technology of providing an electric heater to the urea solution supply pipe and of thawing the frozen urea solution in the pipe with the heater is proposed. For example, JP-A-2005-325691 describes covering an electric heater provided around an outer periphery of a pipe main body of a urea solution supply pipe with a plain-woven mesh, which is woven into a cylindrical shape with a fabric material, together with the pipe main body.

In the case of a conventional technology (including the above-described technology of JP-A-2005-325691) having a heater attached to a urea solution supply pipe, for example, the heater is energized for a predetermined period every time the engine is started, and electric power is consumed by the heater energization. If an in-vehicle battery is assumed as a power source in this case, a load applied to the battery can increase, causing an inconvenience. It is considered that such the inconvenience concerning the power consumption (increase in load of battery or the like) becomes remarkable in the case where the pipe length as the object of the urea solution thawing is long.

SUMMARY OF THE INVENTION

It is an object of the present invention to provide an exhaust purification device of an engine capable of thawing a reducing agent in a frozen state promptly so that the reducing agent can be used in an early stage without causing increase of load applied to a power source due to power consumption.

According to an aspect of the present invention, an exhaust purification device of an engine supplies a reducing agent (urea solution or the like) in a reducing agent vessel to a reducing agent addition valve through a reducing agent passage and the reducing agent addition valve adds the reducing agent into an engine exhaust passage when performing exhaust purification. Thus, specific exhaust purification reaction based on the addition of the reducing agent is promoted at an exhaust purification catalyst (reduction catalyst) provided in the exhaust passage downstream of the reducing agent addition valve. The exhaust purification device has a passage collecting pipe that consists of a plurality of gathered passages. The gathered passages provide a reducing agent passage, through which the reducing agent is supplied from the reducing agent vessel to the reducing agent addition valve, and at least one medium circulation passage for circulating a thawing medium for thawing the reducing agent. That is, the passage collecting pipe is a compound pipe formed by gathering (i.e., collecting) multiple passages such that heat exchange (heat transfer) can occur among the passages.

If air temperature falls at night or the like in a cold district, there is a possibility that the reducing agent in the reducing agent passage freezes. Due to the freeze, the addition of the reducing agent to the exhaust passage upstream of the catalyst becomes impossible. According to the above-described structure, the reducing agent passage and the medium circulation passage that circulates the thawing medium are provided by the passage collecting pipe. Therefore, even if the reducing agent in the reducing agent passage freezes, the frozen urea solution can be thawed promptly by circulation of the thawing medium. In this case, the inconvenience of the increase in the load of the power source (battery) or the like due to the power consumption can be averted unlike the conventional technology that thaws the frozen reducing agent in the pipe by heater energization. Since the reducing agent in the frozen state can be thawed promptly, the reducing agent can be used in an early stage.

BRIEF DESCRIPTION OF THE DRAWINGS

Features and advantages of an embodiment will be appreciated, as well as methods of operation and the function of the related parts, from a study of the following detailed description, the appended claims, and the drawings, all of which form a part of this application. In the drawings:

DETAILED DESCRIPTION OF EXAMPLE EMBODIMENT

Figure 1:
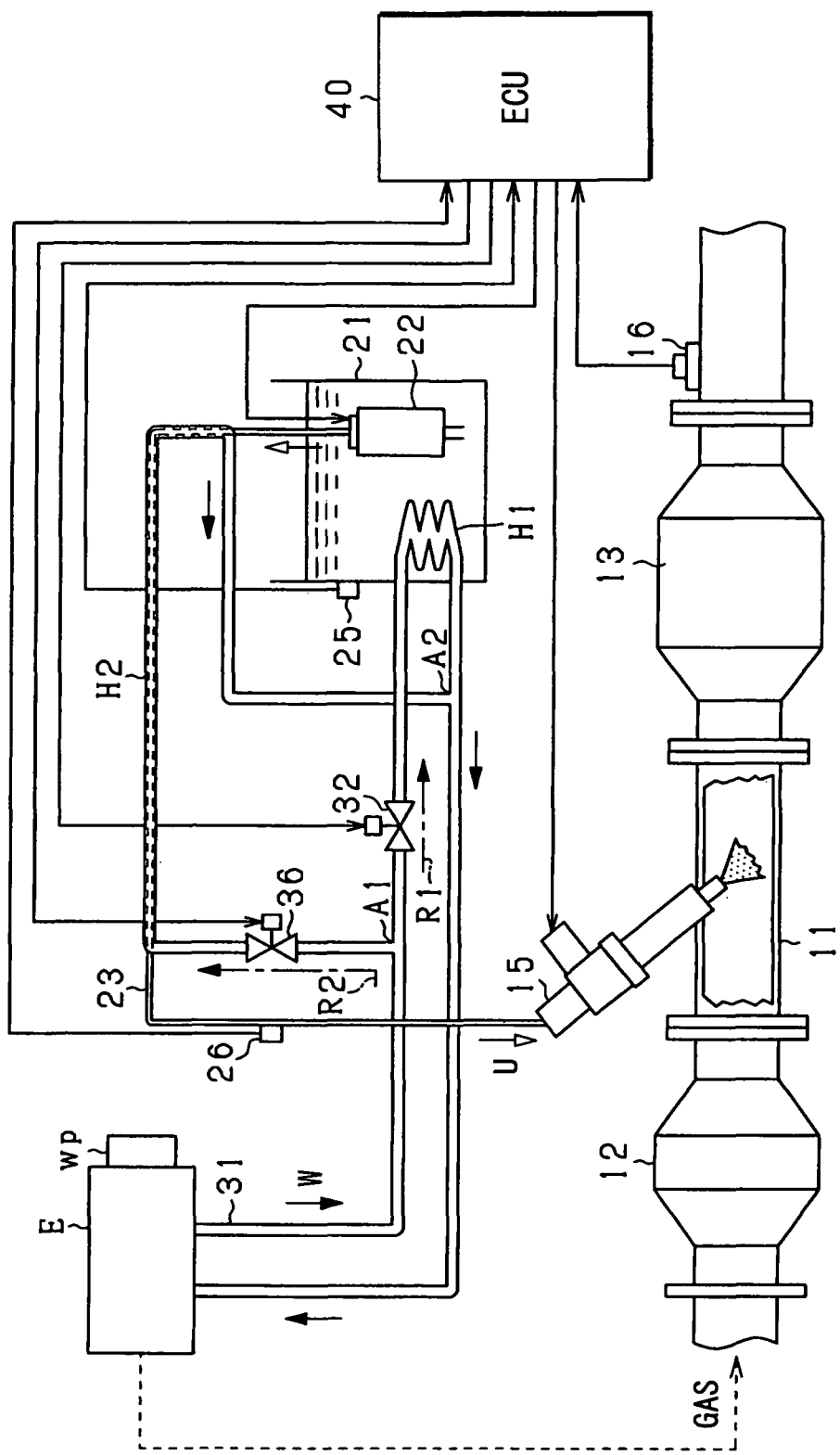
FIG. 1 is a schematic diagram showing a urea SCR system according to an embodiment of the present invention.

Now, an exhaust purification device according to an embodiment of the present invention will be explained in reference to drawings. The exhaust purification device according to the present embodiment purifies NOx in exhaust gas using a selective reduction catalyst and is structured as a urea SCR system. First, the structure of the system will be explained in detail with reference to FIG. 1. FIG. 1 is a schematic diagram showing the urea SCR system according to the present embodiment. The present system purifies exhaust gas discharged by a diesel engine (not shown) mounted in a vehicle. As shown in FIG. 1, the system mainly has various actuators, various sensors, an ECU 40 (electronic control unit) and the like for purifying the exhaust gas.

As a structure of engine exhaust system, an exhaust pipe 11 connected to an engine main body E is provided. A DPF 12 (diesel particulate filter) and a selective reduction catalyst 13 (SCR catalyst) are provided in the exhaust pipe 11. A urea solution addition valve 15 for adding and supplying urea solution as a reducing agent into the exhaust pipe 11 is provided between the DPF 12 and the SCR catalyst 13 in the exhaust pipe 11.

An exhaust sensor 16 incorporating a NOx sensing section (NOx sensor) and an exhaust temperature sensing section (exhaust temperature sensor) therein is provided downstream of the SCR catalyst 13 in the exhaust pipe 11 to sense a NOx quantity in the exhaust gas (eventually, purifying rate of NOx by SCR catalyst 13) and temperature of the exhaust gas downstream of the SCR catalyst 13. An ammonia removing device (for example, oxidation catalyst) for removing excessive ammonia ($NH_3$), an ammonia sensor for sensing the quantity of the ammonia in the exhaust gas and the like may be provided in the further downstream portion of the exhaust pipe 11 when necessary.

The DPF 12 is a continuously-regenerated particulate removal filter for collecting particulate matters in the exhaust gas. The DPF 12 supports an oxidation catalyst of the platinum family and removes HC and CO as well as a soluble organic fraction (SOF) as one of the particulate matter components. The particulate matters collected by the DPF 12 are combusted and removed by post-injection performed after a main fuel injection in the diesel engine or the like as regeneration processing. Thus, the DPF 12 can be continuously used.

The SCR catalyst 13 promotes the reduction reaction (exhaust gas purification reaction) of the NOx. The SCR 13 promotes the reaction, for example, shown by following formulas, to reduce the NOx in the exhaust gas.

$$4NO + 4NH_3 + O_2 \rightarrow 4N_2 + 6H_2O \quad \text{(formula 1)}$$

$$6NO_2 + 8NH_3 \rightarrow 7N_2 + 12H_2O \quad \text{(formula 2)}$$

$$NO + NO_2 + 2NH_3 \rightarrow 2N_2 + 3H_2O \quad \text{(formula 3)}$$

The urea solution addition valve 15 upstream of the SCR catalyst 13 adds and supplies the ammonia ($NH_3$) serving as the reducing agent of NOx in these reactions. The urea solution addition valve 15 has a structure similar to the structure of the existing injector. The urea solution addition valve 15 is an electromagnetic opening/closing valve having a drive section consisting of an electromagnetic solenoid and the like and a valve member section including a needle for opening and closing a tip addition hole. The urea solution addition valve 15 opens and closes based on a drive signal from the ECU 40. That is, if the electromagnetic solenoid is energized based on the drive signal, the needle moves in a valve-opening direction due to the energization. Thus, the tip addition hole is opened by the movement of the needle and the urea solution is added (injected).

The urea solution is serially supplied to the urea solution addition valve 15 from a urea solution tank 21. Next, a structure of a urea solution supply system will be explained. The urea solution tank 21 is structured by a hermetic container with a fluid supply cap and stores the urea solution of prescribed concentration inside. A urea solution pump 22 is located in the urea solution tank 21 such that the urea solution pump 22 is immersed in the urea solution. The urea solution pump 22 is an electric pump driven with a drive signal from the ECU 40 to rotate. An end of a urea solution supply pipe 23 is connected to the urea solution pump 22, and the other end of the urea solution supply pipe 23 is connected to the urea solution addition valve 15. A urea solution passage is defined in the urea solution supply pipe 23. If the urea solution pump 22 is driven to rotate, the urea solution is drawn up and discharged toward the urea solution addition valve 15 through the urea solution supply pipe 23. U in FIG. 1 indicates a flow of the urea solution.

The urea solution pump 22 incorporates a pressure regulating valve (not shown) for regulating the pressure of the urea solution. The discharge pressure of the pump 22 is suitably adjusted by the pressure regulating valve. A filter (not shown) for filtering the urea solution is provided at a discharge port of the urea solution pump 22. The urea solution is serially discharged to the urea solution supply pipe 23 after extraneous matters are removed from the urea solution by the filter.

A first urea solution temperature sensor 25 for sensing the temperature of the urea solution in the urea solution tank 21 is provided to the tank 21. A second urea solution temperature sensor 26 for sensing the temperature of the urea solution in the urea solution supply pipe 23 is provided to the urea solution supply pipe 23. A urea solution thawing device using an engine coolant is provided in the urea solution supply system in order to thaw the frozen urea solution.

The ECU 40 mainly performs control concerning the exhaust gas purification as an electronic control unit in the above-described system. The ECU 40 has a microcomputer (not shown) and performs various kinds of control concerning the exhaust gas purification by operating the various actuators including the urea solution addition valve 15 in desired modes based on the sensing values of the various sensors. For example, the ECU 40 adds and supplies a suitable quantity of the urea solution at suitable timing into the exhaust pipe 11 by controlling the energization time length of the urea solution addition valve 15, the drive amount of the urea solution pump 22 and the like.

In the above-described system according to the present embodiment, the urea solution in the urea solution tank 21 is pumped to the urea solution addition valve 15 through the urea solution supply pipe 23 by the drive of the urea solution pump 22 during engine operation, and the urea solution is added and supplied into the exhaust pipe 11 by the urea solution addition valve 15. Thus, the urea solution and the exhaust gas are added to the SCR catalyst 13 in the exhaust pipe 11, and the reduction reaction of the NOx occurs on the SCR catalyst 13, purifying the exhaust gas. When the NOx is reduced, the urea solution is hydrolyzed as shown by following formula, for example. Thus, the ammonia ($NH_3$) is produced and added to the NOx in the exhaust gas selectively adsorbed by the SCR catalyst 13.

  (formula 4)

The reduction reaction (formula 1 to formula 3) occurs based on the ammonia on the SCR catalyst 13. Thus, the NOx is reduced and purified.

The urea solution used as the reducing agent freezes at −11° C. If the urea solution freezes, the addition supply of the urea solution to the exhaust pipe 11 upstream of the catalyst 13 cannot be performed. Therefore, in the present embodiment, in order to thaw the frozen urea solution promptly, a part of the urea solution supply pipe 23 has a double pipe structure (compound pipe structure). One of the two passages provided by the double pipe structure is used as a urea solution passage and the other one is used as an engine coolant passage. In this case, the engine coolant is equivalent to a medium for thawing the urea solution (reducing agent).

Next, a structure of a coolant circulation system for circulating the engine coolant will be explained. As shown in FIG. 1, a coolant circulation pipe 31 circulates the engine coolant heated in the engine main body E through the urea solution supply system and is partly located in the urea solution tank 21. W in FIG. 1 indicates the flow of the engine coolant. A pipe section of the coolant circulation pipe 31 provided in the urea solution tank 21 defines a tank heating section H1. In the tank heating section H1, the coolant circulation pipe 31 is formed in a spirally bent shape (i.e., in a spiral shape). The engine coolant flowing out of a coolant passage of the engine main body E (i.e., engine water jacket) passes through the tank heating section H1 and then returns to the engine main body E. Thus, the coolant circulates through the coolant circulation pipe 31. A water pump WP driven by the engine is provided near the engine main body E. The circulation of the engine coolant is performed by the drive of the water pump WP.

An electromagnetic opening/closing valve 32 is provided in the coolant circulation pipe 31 between the engine main body E and the tank heating section H1. The circulation (flow in direction R1 in FIG. 1) of the engine coolant to the tank heating section H1 is allowed by opening the opening/closing valve 32. The circulation (flow in direction R1 in FIG. 1) of the engine coolant to the tank heating head H1 is prohibited by closing the opening/closing valve 32.

The coolant circulation pipe 31 branches at two points (A1, A2 in FIG. 1) to detour around the tank heating section H1. Thus, in addition to the passage for leading the engine coolant into the urea solution tank 21, another passage leading the engine coolant to the double pipe section provided in a portion of the urea solution supply pipe 23 is provided. The diameter of the coolant circulation pipe 31 is larger than the urea solution supply pipe 23. The double pipe is structured by defining the urea solution supply pipe 23 as the inner pipe and by defining the coolant circulation pipe 31 as the outer pipe as shown in FIG. 2.

Figure 2:
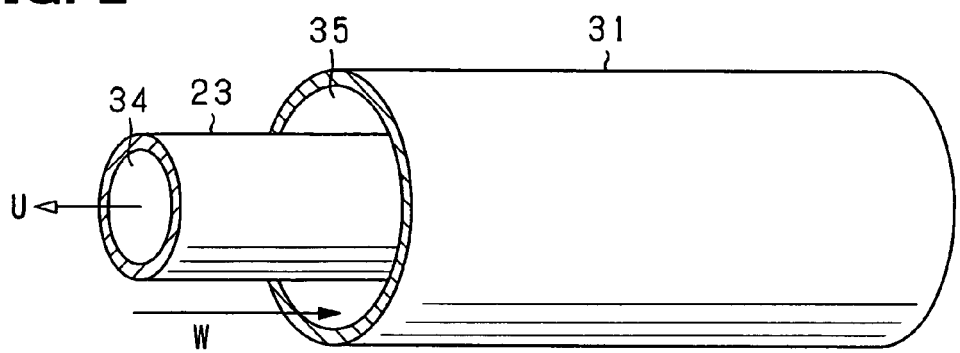
FIG. 2 is a perspective view showing a double pipe portion according to the embodiment.

As shown in FIG. 2, both the urea solution supply pipe 23 and the coolant circulation pipe 31 are cylinder tubes. The diameter of the coolant circulation pipe 31 is substantially twice as large as the diameter of the urea solution supply pipe 23. For example, the diameter of the urea solution supply pipe 23 is approximately 6.5 mm and the diameter of the coolant circulation pipe 31 is approximately 13 mm. The material of both the pipes 23, 31 is a stainless-steel material (for example, SUS304). In the thus-structured double pipe section, the urea solution flows through a urea solution passage 34 (inner passage) formed by the urea solution supply pipe 23, and the engine coolant flows through a coolant passage 35 (outer passage) formed between the outer peripheral face of the urea solution supply pipe 23 and the inner peripheral face of the coolant circulation pipe 31. In the structure of the present embodiment, the flow direction of the urea solution and the flow direction of the engine coolant are opposite to each other (i.e., oppositely oriented). Alternatively, the flow directions may be the same.

In FIG. 1, the double pipe section serves as a urea solution pipe heating section H2. In this case, the engine coolant flowing out of the engine main body E circulates through the inside of the coolant circulation pipe 31 and returns to the engine main body E after passing through the urea solution pipe heating section H2.

An electromagnetic opening/closing valve 36 is provided in the coolant circulation pipe 31 between the branch point A1 and the urea solution pipe heating section H2. The circulation (flow in direction R2 in FIG. 1) of the engine coolant to the double pipe section of the coolant circulation pipe 31 is allowed by opening the opening/closing valve 36. The circulation (flow in direction R2 in FIG. 1) of the engine coolant to the double pipe section of the coolant circulation pipe 31 is prohibited by closing the opening/closing valve 36.

The urea solution supply pipe 23 (entirety from urea solution tank 21 to urea solution addition valve 15) is not entirely formed in the double pipe structure. Rather, only a part of the urea solution supply pipe 23 is formed in the double pipe structure. That is, it is thought that the urea solution supply pipe 23 has a portion where the frozen urea solution is easily thawed and another portion where the frozen urea solution is not easily thawed. It is thought that the frozen urea solution is easily thawed by the heat from the exhaust pipe 11 in a portion near the urea solution addition valve 15. Therefore, in the present embodiment, a portion of the urea solution supply pipe 23 within a prescribed distance (for example, 50 cm) from the urea solution addition valve 15 is not formed in the double pipe structure but is formed as a usual single pipe.

The portion of the urea solution supply pipe 23 having the single pipe structure corresponds to an exhaust heat reception section, to which exhaust heat is transmitted from the exhaust pipe 11 through the urea solution addition valve 15. Preferably, temperature increase amounts (pipe wall temperature increase amounts) of the urea solution supply pipe 23 after the engine start should be obtained at multiple points of the urea solution supply pipe 23 through experiments or the like, and it should be determined which portion of the urea solution supply pipe 23 corresponds to the heat reception section based on the temperature increase amounts. At this time, the portion of the urea solution supply pipe 23 where the temperature increase rate (temperature increase amount per unit time) is equal to or higher than a predetermined standard value is defined as the exhaust heat reception section.

A pipe member having a diameter smaller than the above-described diameter may be used in the portion of the coolant circulation pipe 31 that does not have the double pipe structure. For example, a pipe member having the diameter (for example, approximately 3 mm) smaller than the above-described diameter may be used in the tank heating section H1 or the pipe section (A1 to A2 in FIG. 1) including the tank heating section H1. Since the coolant circulation pipe 31 in the tank heating section H1 is bent into the spiral shape in the manufacturing process, the processing performance can be improved by using the pipe member of the small diameter. In the above-described structure, the coolant circulation pipe 31 is connected to the engine main body E. Alternatively, the coolant circulation pipe 31 may be connected to a radiator (not shown). In this case, the engine coolant flows from the radiator into the coolant circulation pipe 31.

When the urea solution in the urea solution tank 21 or the urea solution in the urea solution supply pipe 23 freezes in a cold district, both the opening/closing valves 32, 36 provided in the coolant circulation pipe 31 are opened. The engine coolant flowing out of the engine main body E into the coolant circulation pipe 31 is fed to the tank heating section H1 and the urea solution pipe heating section H2 respectively. Thus, the frozen urea solution of the urea solution tank 21 or the urea solution supply pipe 23 is thawed by the heat of the engine coolant.

Figure 3:
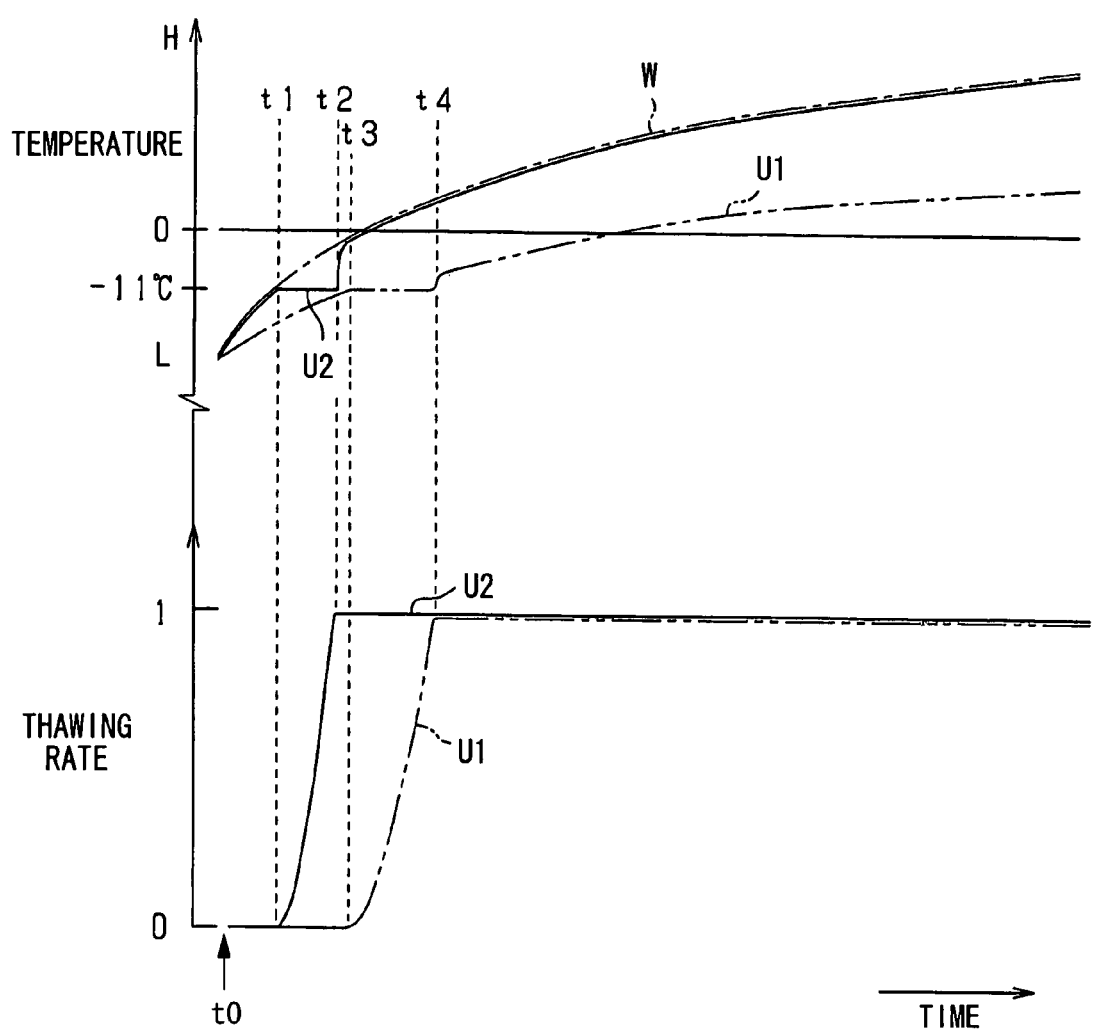
FIG. 3 is a time chart for explaining a change of a state of a urea solution immediately after engine start according to the embodiment.

FIG. 3 is a time chart for explaining the change of the state of the urea solution immediately after the engine start. In FIG. 3, a chained line W shows the temperature change of the engine coolant, an upper solid line U2 shows the temperature change of the urea solution in the double pipe section, and an upper chain double dashed line U1 shows the temperature change of the urea solution in the urea solution tank 21 (near pump) respectively. In FIG. 3, a lower solid line U2 shows the urea thawing rate of the double pipe section, and a lower chain double dashed line U1 shows the urea thawing rate of the urea solution tank 21 (near pump) respectively. In this example, a case where the engine start is performed when the urea solution is frozen is assumed. The temperature of the coolant and the urea solution as of the engine start is very low temperature (for example, −20° C.).

If the engine starts at timing t0 in FIG. 3, the temperature of the engine coolant starts increasing. At this time, the temperature of the urea solution in the double pipe section increases to follow the temperature increase of the engine coolant since the urea solution supply pipe 23 (urea solution passage 34) and the coolant circulation pipe 31 (coolant passage 35) are provided as the inner/outer passages in the double pipe section.

If the urea solution temperature reaches a freezing point (−11° C.) at timing t1, the urea solution temperature is held at the freezing point until timing t2 thereafter. During the period from t1 to t2, the frozen urea solution is thawed by the thawing heat applied by the engine coolant in the urea solution pipe heating section H2. The urea solution temperature starts increasing again at timing t2, at which the entire urea solution thaws. The urea thawing rate of the urea solution in the double pipe section starts increasing from 0 (meaning entirely frozen state) at timing t1 and reaches 1 (meaning entirely thawed state) at timing t2.

The temperature increase of the urea solution in the urea solution tank 21 is slower than that of the urea solution in the double pipe section. If the urea solution temperature reaches the freezing point (−11° C.) at timing t3, the urea solution temperature is held at the freezing point until timing t4 thereafter. During the period from t3 to t4, the frozen urea solution is thawed by the thawing heat applied by the engine coolant in the tank heating section H1. The urea solution temperature starts increasing again at timing t4, at which the entire urea solution thaws. The urea thawing rate of the urea solution in the urea solution tank 21 (near pump) starts increasing at the timing t3 and reaches 1 at the timing t4.

If the circulation of the engine coolant through the coolant circulation pipe 31 is continued during the operation of the engine, hydrolysis of the urea solution arises in the urea solution tank 21 or the urea solution supply pipe 23 with the increase of the urea solution temperature. The inventors of the present invention confirmed that the hydrolysis of the urea solution arises and the ammonia is generated if the temperature of the urea solution increases to approximately 60° C. If the ammonia is generated in the urea solution tank 21 or the urea solution supply pipe 23, a vapor lock state can arise. In such the case, there occurs a concern about an adverse effect to the urea solution addition from the urea solution addition valve 15. Therefore, in the present embodiment, the temperature of the urea solution in the urea solution tank 21 and the temperature of the urea solution in the urea solution supply pipe 23 are monitored serially and respectively. According to the result, the opening/closing valves 32, 36 of the coolant circulation pipe 31 are opened and closed to suitably stop the circulation of the engine coolant.

Figure 4:
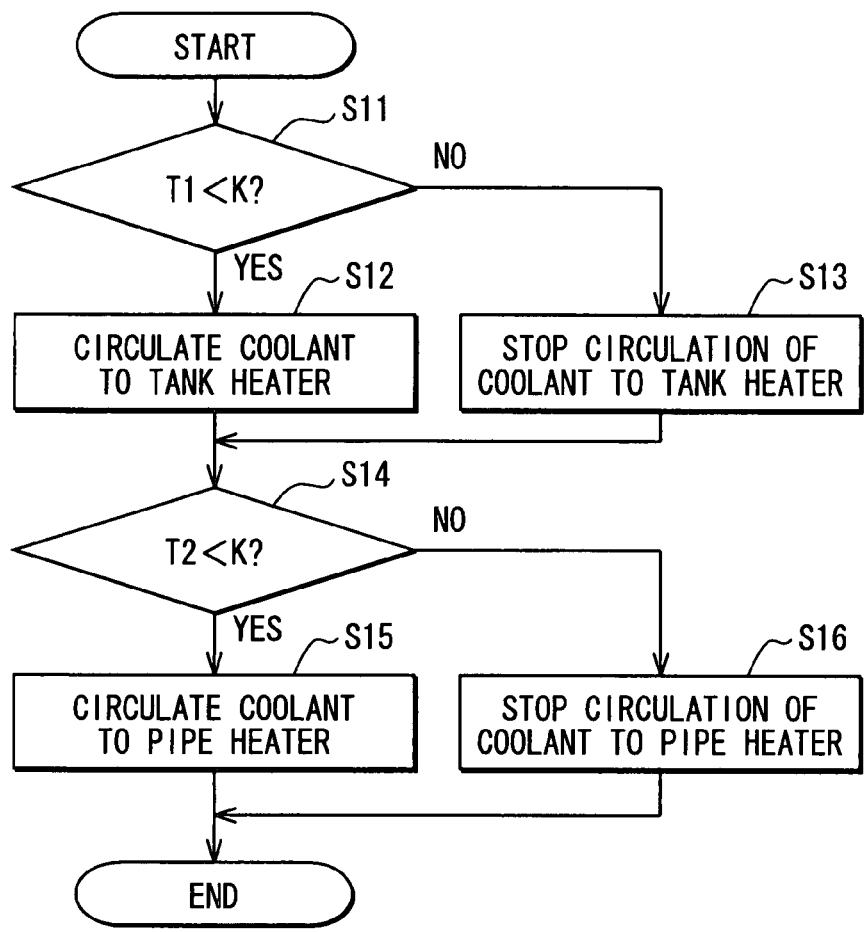
FIG. 4 is a flowchart showing a procedure of processing concerning opening/closing control of an opening/closing valve according to the embodiment.

FIG. 4 is a flowchart showing a procedure of processing concerning the opening/closing control of the opening/closing valves 32, 36. The ECU 40 executes the processing in a predetermined time cycle. In FIG. 4, S11 determines whether the urea solution temperature T1 in the urea solution tank 21 calculated from the sensing signal of the first urea solution temperature sensor 25 is lower than a predetermined value K (for example, 60° C.). If T1<K, the processing proceeds to S12 to open the opening/closing valve 32 such that the engine coolant is circulated to the tank heating section H1. If T1≧K, the processing proceeds to S13 to close the opening/closing valve 32 such that the circulation of the engine coolant to the tank heating section H1 is stopped.

S14 determines whether the urea solution temperature T2 in the urea solution supply passage 23 calculated from the sensing signal of the second urea solution temperature sensor 26 is lower than a predetermined value K (for example, 60° C.). If T2<K, the processing proceeds to S15 to open the opening/closing valve 36 such that the engine coolant is circulated to the urea solution pipe heating section H2 (double pipe section). If T2≧K, the processing proceeds to S16 to close the opening/closing valve 36 such that the circulation of the engine coolant to the urea solution pipe heating section H2 is stopped.

The present embodiment exerts following effects.

The urea solution supply pipe 23 (urea solution passage 34) and the coolant circulation pipe 31 (coolant passage 35) are provided as the double pipe structure of the inner passage and the outer passage. Accordingly, even if the urea solution in the urea solution supply pipe 23 (urea solution passage 34) freezes, the frozen urea solution can be thawed promptly by the circulation of the engine coolant. With such the scheme, the inconvenience of causing the load increase of the battery or the like due to the power consumption as in the conventional technology that thaws the frozen urea solution in the pipe through energization of the heater is solved. Since the urea solution in the frozen state can be thawed promptly, the urea solution can be used in an early stage. Thus, the exhaust purification effect is improved and the exhaust emission can be improved.

The scheme of circulating the engine coolant also through the urea solution tank 21 is employed. Therefore, the frozen state of the urea solution in the urea solution tank 21 can be also canceled (thawed) in an early stage. Therefore, the suitable structure can be provided as the entire system.

Generally, the engine coolant is constantly circulated after the engine start. In the above-described embodiment, the scheme of thawing the urea solution (frozen urea solution) with the use of the circulation is used. As a result, the urea solution can be thawed in an early stage with the thawing heat applied from the engine coolant after the engine start.

The urea solution temperature in the urea solution supply pipe 23 is sensed. When the sensed urea solution temperature increases approximately to 60° C. (predetermined temperature set based on urea solution reaction temperature), the circulation of the engine coolant is stopped. Thus, the excessive temperature increase of the reducing agent can be prevented, and inconvenience such as the vapor lock can be avoided.

Not an entirety but only a portion of the urea solution supply pipe 23 is structured as the double pipe structure. Accordingly, the cost increase due to the double pipe structure can be suppressed as much as possible. Thawing with the exhaust heat is performed at the part of the urea solution supply pipe 23 near the urea solution addition valve 15 where the single pipe structure is used.

The electromagnetic injector type opening/closing valve is used as the urea solution addition valve 15. Therefore, ON/OFF of the urea solution addition, the control of the urea solution addition quantity and the like can be performed arbitrarily with high accuracy. Thus, wasteful consumption of the urea solution can be inhibited and the urea solution consumption can be reduced.

The urea solution addition valve 15 is provided downstream of the DPF 12 (filter for particulate matter removal). Thus, the inconvenience that the tip addition hole of the urea solution addition valve 15 is tainted by the particulate matters can be inhibited. As a result, the urea solution addition valve 15 can be used over a long period of time.

The system that uses the urea solution as the reducing agent for the SCR catalyst 13 and that promotes the NOx reduction reaction (formula 1 to formula 3) with the SCR catalyst 13 to reduce the NOx with the ammonia generated from the urea solution is mounted in the vehicle having the diesel engine. Thus, the generation of the NOx in the combustion stroke is allowed, so the performance concerning the fuel consumption and the particulate matters is improved. This greatly contributes to the improvement of the performance of the vehicle and the purification of the exhaust gas.

The above-described embodiment may be modified as follows, for example.

Figure 5:
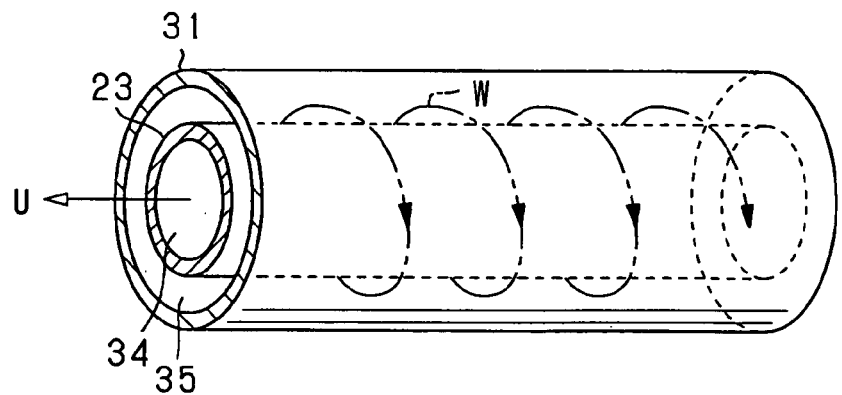
FIG. 5 is a perspective view showing a double pipe structure according to another embodiment of the present invention.

In the double pipe section, the substantial passage length of the coolant passage 35 in the coolant circulation pipe 31 may be set longer than the passage length of the urea solution passage 34 in the urea solution supply pipe 23. For example, as shown in FIG. 5, a compound pipe structure is formed by providing the urea solution supply pipe 23 (urea solution passage 34) inside as described above and by providing the coolant circulation pipe 31 (coolant passage 35) outside such that the coolant passage 35 extends spirally around the urea solution supply pipe 23. In this case, the urea solution linearly flows through the inside of the urea solution passage 34 (in longitudinal direction of pipe) and the engine coolant flows while circling spirally around the periphery of the urea solution supply pipe 23. With this structure, the urea solution (frozen urea solution) in the urea solution supply pipe 23 (urea solution passage 34) can be thawed efficiently.

The practical structure for forming the spiral coolant passage 35 may be formed by providing a spiral passage wall between the outer peripheral surface of the urea solution supply pipe 23 and the inner peripheral surface of the coolant circulation pipe 31 or by providing a spiral waviness in the coolant circulation pipe 31 by twisting the coolant circulation pipe 31 in the radial direction.

In the above-described embodiment, the urea solution supply pipe 23 is provided inside and the coolant circulation pipe 31 is provided outside in the double pipe section, in which the urea solution supply pipe 23 and the coolant circulation pipe 31 are formed in the double structure of the inner passage and the outer passage. Conversely, the urea solution supply pipe 23 may be provided outside and the coolant circulation pipe 31 may be provided inside. That is, in this case, the urea solution passage serves as the outer passage, and the coolant passage serves as the inner passage.

In the above-described embodiment, not the entirety but only part of the urea solution supply pipe 23 is formed in the double pipe structure. Alternatively, the entirety of the urea solution supply pipe 23 may be structured as the double pipe structure.

In the above-described embodiment, the urea solution supply pipe 23 is made of the stainless-steal material. Alternatively, for example, the urea solution supply pipe 23 may be made of a resin material having excellent corrosion resistance against the urea solution such as PPS (polyphenylene sulfide) resin. It is desirable to use a metallic material as a pipe material, taking a heat conducting characteristic into consideration.

Figure 6:
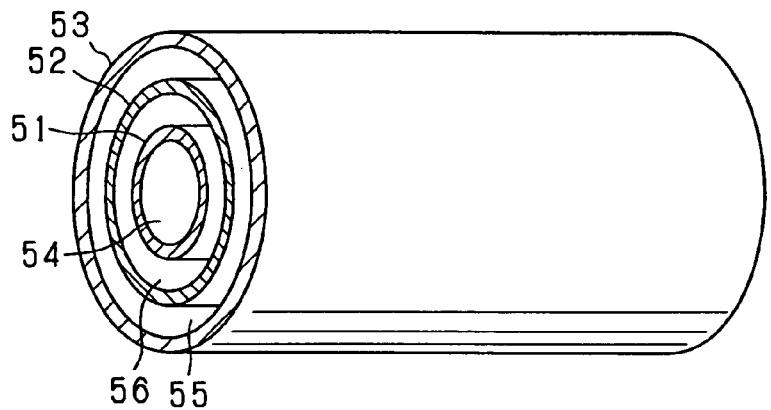
FIG. 6 is a perspective view showing a triple pipe structure according to another embodiment of the present invention.

In the above-described embodiment, a part of the urea solution supply pipe 23 is formed in the double pipe structure. Alternatively, a part of the urea solution supply pipe 23 may be formed in a triple pipe structure. That is, as shown in FIG. 6, three cylindrical pipes 51, 52, 53 may be used to form a compound pipe structure having an outer passage, a middle passage, and an inner passage. Out of the three passages formed by these cylindrical pipes 51-53, the innermost passage and the outermost passage may serve as coolant passages 54, 55 (medium circulation passages) and the intermediate passage between the coolant passages 54, 55 may serve as a urea solution passage 56 (reducing agent passage). With this structure, the urea solution (frozen urea solution) in the urea solution passage 56 is thawed with the engine coolant flowing through the inside of the coolant passage 54 radially inside the urea solution passage 56 and the engine coolant flowing through the coolant passage 55 radially outside the urea solution passage 56. Thus, time necessary for thawing the urea solution can be shortened.

In the triple pipe structure shown in FIG. 6, the direction of the engine coolant flowing through the two coolant passages 54, 55 and the direction of the urea solution flowing through the urea solution passage 56 may be the same. Alternatively, the flow direction of the engine coolant may be different from that of the urea solution. Thawing of the urea solution can be completed more quickly by setting the flow directions of the coolant flowing through the two coolant passages 54, 55 to be opposite (alternate), i.e., by making the engine coolant inflow in the both directions. It is considered that the frozen urea solution is thawed more quickly on the inlet side of the coolant passages 54, 55 than on the outlet side in the triple pipe section. By making the engine coolant inflow in the both directions as mentioned above, the urea solution can be thawed from the both ends of the triple pipe section, and the thawing of the urea solution in the entirety of the pipe can be expedited.

Figure 7A:
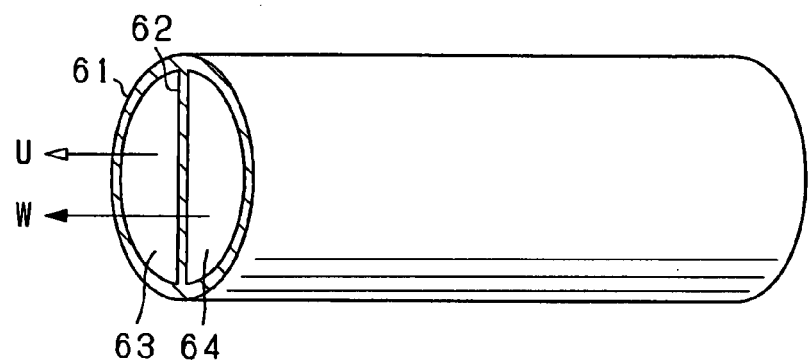
FIG. 7A is a perspective view showing a passage collecting pipe structure according to another embodiment of the present invention.
Figure 7B:
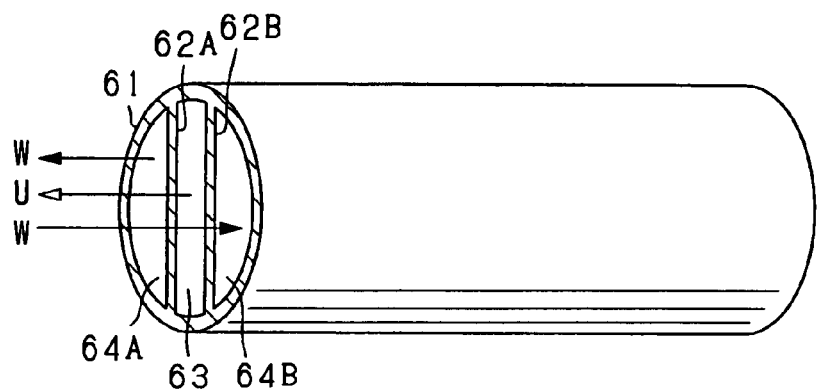
FIG. 7B is a perspective view showing a passage collecting pipe structure according to yet another embodiment of the present invention.

In above-described embodiment, the compound pipe structure (double or triple pipe, structure) having the compound passages is adopted as a passage collecting structure, in which the multiple passages are gathered. Alternatively, other structures may be employed. That is, as shown in FIG. 7A, a partition wall 62 for dividing the internal passage into two passages may be provided in a cylindrical pipe 61 having a circular cross section. In this case, one of the two passages formed in the pipe 61 is used as a urea solution passage 63 and the other one is used as a coolant passage 64. As shown in FIG. 7B, two partition walls 62A, 62B may be provided in the pipe 61. In this case, one of the three passages formed in the pipe 61 may be used as a urea solution passage 63 and the other two passages may be used as coolant passages 64A, 64B. In this case, the urea solution passage 63 should be preferably sandwiched between the two coolant passages 64A, 64B, and the circulation directions of the engine coolant flowing through the coolant passages 64A, 64B should be preferably set opposite (alternative) to each other. Also with such the structures, the urea solution (frozen urea solution) in the urea solution supply passage 63 can be thawed efficiently.

In addition, a structure in which multiple pipes (urea solution pipes and coolant pipes) are bundled so that heat exchange can be performed among the passages may be employed. In this case, the adjacent pipes should preferably contact each other through faces thereof.

In the above-described embodiment, the engine coolant is used as the thawing medium. Alternatively, the exhaust gas discharged from the engine may be used as the thawing medium. For example, a part of the urea solution supply pipe 23 may be formed in the double pipe structure, and one of the two passages may be used as a urea solution passage and the other one may be used as an exhaust gas passage. In this case, the urea solution (frozen urea solution) is thawed by exhaust heat. Since temperature of the exhaust gas is higher than that of the engine coolant, the exhaust gas may be led to the double pipe section through a heat radiation section.

Alternatively, a refrigerant of an air-conditioner may be used as the thawing medium. For example, a part of the urea solution supply pipe 23 may be formed in the double pipe structure, and one of the two passages may be used as a urea solution passage and the other one may be used as a refrigerant passage. In this case, the urea solution (frozen urea solution) is thawed by heat of the refrigerant.

As mentioned above, when the triple pipe structure is used, different thawing media may be circulated respectively through the innermost passage and the outermost passage constituting the medium circulation passages. For example, the engine coolant may be circulated through one of the innermost passage and the outermost passage, and the exhaust gas may be circulated through the other one.

In the above-described embodiment, the temperature sensor (second urea solution temperature sensor 26) for sensing the temperature of the urea solution in the supply pipe 23 is provided to the urea solution supply pipe 23. Based on the sensing result of the temperature sensor, opening and closing of the opening/closing valve 36 (i.e., ON/OFF of coolant circulation to double pipe section) are controlled. Instead of the temperature sensing of the urea solution in the urea solution supply pipe 23, temperature sensing of the engine coolant in the coolant circulation pipe 31 may be performed, and the opening and closing of the opening/closing valve 36 may be controlled based on the sensing result. That is, when the engine is started from a cold state, the urea solution temperature substantially coincides with the coolant temperature. Accordingly, a coolant temperature sensor can be used as a urea solution temperature sensing device.

A structure of leading the engine coolant, which is circulated through the coolant circulation pipe 31, to the urea solution addition valve 15 may be used. For example, a branch pipe may be provided in the middle of the coolant circulation pipe 31, and the branch pipe may be connected to the urea solution addition valve 15. Thus, the urea solution addition valve 15 can be cooled with the engine coolant supplied to the urea solution addition valve 15 through the coolant circulation pipe 31 and the branch pipe during the engine operation.

A scheme of providing a heater in the urea solution tank 21 and thawing the urea solution (frozen urea solution) in the tank 21 with the heater may be employed.

In the above-described embodiments, the urea solution thawing devices (tank heating section H1, urea solution pipe heating section H2) using the engine coolant or the like are provided to both of the urea solution tank 21 and the urea solution supply pipe 23. Alternatively, a scheme of providing the urea solution thawing device only to the urea solution supply pipe 23 may be employed.

An air-assist type addition valve may be used as the urea solution addition valve. For example, a scheme of leading a compressed air compressed by a compressor (in-vehicle compressor) to the urea solution supply system and of atomizing the urea solution with the compressed air may be employed. A certain heavy-duty truck has an air supply source for regulating braking pressure. Such the air supply source may be used as an air supply source for the air assist.

In the actual condition, practical application as a urea SCR system for an in-vehicle diesel engine is being examined. Practical application as a urea SCR system for other engines such as a gasoline engine (spark ignition type engine) is also possible. The present invention can be also applied to an exhaust purification system using a reducing agent other than the urea solution in a similar manner.

While the invention has been described in connection with what is presently considered to be the most practical and preferred embodiments, it is to be understood that the invention is not to be limited to the disclosed embodiments, but on the contrary, is intended to cover various modifications and equivalent arrangements included within the spirit and scope of the appended claims.

What is claimed is:

1. An exhaust purification device of an engine comprising:
   a reducing agent vessel that stores a liquid reducing agent;
   a reducing agent addition valve that receives the reducing agent from the reducing agent vessel and that adds the reducing agent into an exhaust passage of the engine;
   an exhaust purification catalyst that is provided in the exhaust passage downstream of the reducing agent addition valve and that promotes specific exhaust purification reaction with the added reducing agent;
   a passage collecting pipe that consists of a plurality of gathered passages, the gathered passages providing a reducing agent passage, through which the reducing agent is supplied from the reducing agent vessel to the reducing agent addition valve, and at least one medium circulation passage for circulating a thawing medium for thawing the reducing agent;
   a temperature sensing device that senses temperature of the reducing agent in the reducing agent passage; and
   a circulation stopping device that stops the circulation of the thawing medium through the medium circulation passage when the sensed temperature of the reducing agent rises to a predetermined temperature range set based on a reducing agent reaction temperature, above which a chemical reaction of the reducing agent occurs to generate a gas.

2. The exhaust purification device as in claim 1, wherein the passage collecting pipe is a compound pipe having an inner passage and an outer passage as at least some of the gathered passages.

3. The exhaust purification device as in claim 1, wherein the thawing medium is an engine coolant for cooling the engine, and
   the engine coolant is lead to the medium circulation passage.

4. The exhaust purification device as in claim 1, wherein
the thawing medium is exhaust gas discharged from the engine, and
the exhaust gas is lead to the medium circulation passage.

5. The exhaust purification device as in claim 1, wherein
the thawing medium is a refrigerant for an air-conditioner, and
the refrigerant is lead to the medium circulation passage.

6. The exhaust purification device as in claim 1, wherein
the reducing agent passage has a heat reception section that is close to the reducing agent addition valve and that receives exhaust heat transmission from the exhaust passage through the reducing agent addition valve, and
the passage collecting pipe provides the reducing agent passage excluding the heat reception section.

7. The exhaust purification device as in claim 1, wherein
the passage collecting pipe is structured such that substantial passage length of the medium circulation passage is longer than passage length of the reducing agent passage.

8. The exhaust purification device as in claim 7, wherein
the passage collecting pipe is provided as a double pipe structure consisting of the reducing agent passage as an inner passage and the medium circulation passage as an outer passage such that the medium circulation passage is formed in a spiral shape around a reducing agent supply pipe defining the reducing agent passage.

9. The exhaust purification device as in claim 1, wherein
the passage collecting pipe provides the reducing agent passage and two medium circulation passages as the gathered passages such that circulation directions of the thawing medium of the two medium circulation passages are opposite to each other.

10. The exhaust purification device as in claim 1, wherein
the passage collecting pipe is structured as a triple pipe structure consisting of an innermost passage and an outermost passage as the medium circulation passages and an intermediate passage as the reducing agent passage between the innermost passage and the outermost passage.

11. The exhaust purification device as in claim 10, wherein
the innermost passage and the outermost passage are set such that circulation directions of the thawing medium of the innermost passage and the outermost passage are opposite to each other.

12. The exhaust purification device as in claim 1, wherein
the thawing medium is lead to the reducing agent vessel in addition to the passage collecting pipe.

13. The exhaust purification device as in claim 1, wherein
the reducing agent is a urea solution, and
the exhaust purification catalyst promotes reduction reaction for reducing nitrogen oxides with ammonia generated from the urea solution as the exhaust purification reaction.

14. An exhaust purification device of an engine comprising:
a reducing agent vessel that stores a liquid reducing agent;
a reducing agent addition valve that receives the reducing agent from the reducing agent vessel and that adds the reducing agent into an exhaust passage of the engine;
an exhaust purification catalyst that is provided in the exhaust passage downstream of the reducing agent addition valve and that promotes specific exhaust purification reaction with the added reducing agent; and
a passage collecting pipe that consists of a plurality of gathered passages, the gathered passages providing a reducing agent passage, through which the reducing agent is supplied from the reducing agent vessel to the reducing agent addition valve, and at least one medium circulation passage for circulating a thawing medium for thawing the reducing agent, wherein
the thawing medium is a refrigerant for an air-conditioner, and
the refrigerant is lead to the medium circulation passage.

15. An exhaust purification device of an engine comprising:
a reducing agent vessel that stores a liquid reducing agent;
a reducing agent addition valve that receives the reducing agent from the reducing agent vessel and that adds the reducing agent into an exhaust passage of the engine;
an exhaust purification catalyst that is provided in the exhaust passage downstream of the reducing agent addition valve and that promotes specific exhaust purification reaction with the added reducing agent; and
a passage collecting pipe that consists of a plurality of gathered passages, the gathered passages providing a reducing agent passage, through which the reducing agent is supplied from the reducing agent vessel to the reducing agent addition valve, and at least one medium circulation passage for circulating a thawing medium for thawing the reducing agent, wherein
the passage collecting pipe is structured such that substantial passage length of the medium circulation passage is longer than passage length of the reducing agent passage, and
the passage collecting pipe is provided as a double pipe structure consisting of the reducing agent passage as an inner passage and the medium circulation passage as an outer passage such that the medium circulation passage is formed in a spiral shape around a reducing agent supply pipe defining the reducing agent passage.

16. An exhaust purification device of an engine comprising:
a reducing agent vessel that stores a liquid reducing agent;
a reducing agent addition valve that receives the reducing agent from the reducing agent vessel and that adds the reducing agent into an exhaust passage of the engine;
an exhaust purification catalyst that is provided in the exhaust passage downstream of the reducing agent addition valve and that promotes specific exhaust purification reaction with the added reducing agent; and
a passage collecting pipe that consists of a plurality of gathered passages, the gathered passages providing a reducing agent passage, through which the reducing agent is supplied from the reducing agent vessel to the reducing agent addition valve, and at least one medium circulation passage for circulating a thawing medium for thawing the reducing agent, wherein
the passage collecting pipe is structured as a triple pipe structure consisting of an innermost passage and an outermost passage as the medium circulation passages and an intermediate passage as the reducing agent passage between the innermost passage and the outermost passage.

17. The exhaust purification device as in claim 16, wherein
the innermost passage and the outermost passage are set such that circulation directions of the thawing medium of the innermost passage and the outermost passage are opposite to each other.

* * * * *